No. 724,264. PATENTED MAR. 31, 1903.
R. G. CROSBY.
TAG.
APPLICATION FILED JULY 3, 1902.
NO MODEL.

Witnesses.
Robert Everett,
H B Keefer

Inventor,
Robert G. Crosby,
By James L. Norris.
Atty.

UNITED STATES PATENT OFFICE.

ROBERT G. CROSBY, OF SAN ANTONIO, TEXAS.

TAG.

SPECIFICATION forming part of Letters Patent No. 724,264, dated March 31, 1903.

Application filed July 3, 1902. Serial No. 114,316. (No model.)

*To all whom it may concern:*

Be it known that I, ROBERT G. CROSBY, a citizen of the United States, residing at San Antonio, in the county of Bexar and State of Texas, have invented new and useful Improvements in Tags, of which the following is a specification.

This invention relates to certain new and useful improvements in tags, and is particularly adapted for use in tagging bales of cotton, and is also applicable for tagging bales, sacks, or other receptacles containing cotton, wool, or other materials.

The invention aims to provide a tag for indicating the weight or quantity of material contained in a bale, sack, or other receptacle in such a manner that the indication of the weight or quantity of the material cannot be raised or lowered, thereby preventing fraud.

The invention further aims to provide a tag formed of a plurality of sections adapted for indicating in duplicate, triplicate, or quadruplicate the weight or quantity of material contained in a bale, sack, or other receptacle in such a manner that the indication of the weight or quantity cannot be raised or lowered, and thereby preventing fraud. Each section is correspondingly numbered and one is adapted to be attached to the bale, sack, or other receptacle, while the other of the sections is adapted for recording, reference, or certifying the weight or quantity of material contained in the bale, sack, or receptacle, thus the sections further assisting in preventing fraud, as the indication upon the attached section is always adapted to correspond with the detached section or sections.

The invention further aims to provide a tag adapted for the purpose hereinbefore set forth which shall be extremely simple, strong, durable, efficient in its use, and comparatively inexpensive to set up; and to this end it consists of the novel construction and arrangement of parts hereinafter more specifically described, illustrated in the accompanying drawings, and particularly pointed out in the claims hereunto appended.

In describing the invention in detail reference is had to the accompanying drawings, forming a part of this specification, wherein like numerals of reference indicate corresponding parts throughout the both views, and in which—

Figure 1:
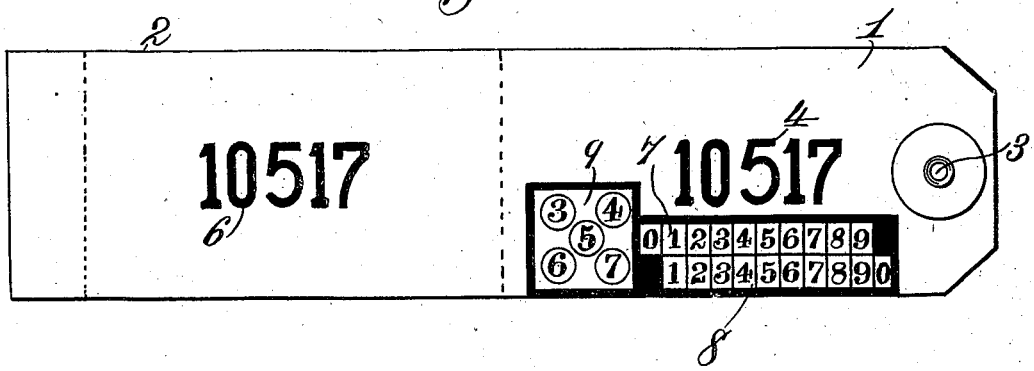
Figure 2:
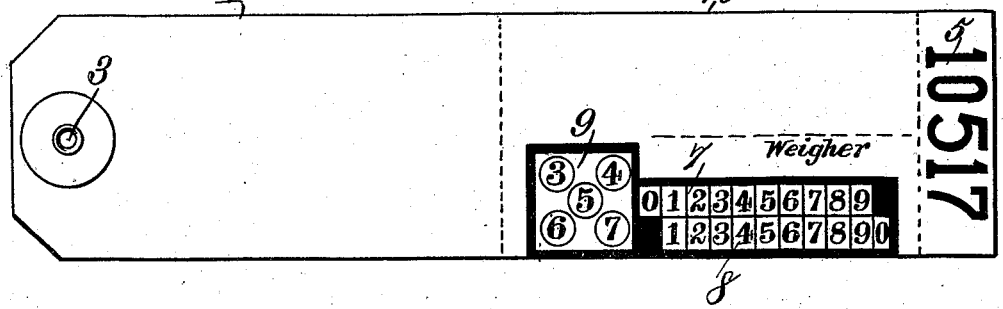

Figure 1 is a plan showing the inner face of the tag before the sections are separated, and Fig. 2 is a plan showing the outer face of the tag before the sections are separated.

Referring to the drawings, wherein is shown my improved tag composed only of two sections, although the same can be formed of three or more sections, if desired, the reference-numeral 1 denotes the attachable section, and the reference-numeral 2 the removable, recording, reference, or certifying section. The attachable section 1 is provided with one or more eyelets 3 (only one shown) to permit of attaching the section 1 by cord, wire, or other suitable means (not shown) to the bale, sack, or other receptacle. (Not shown.)

Each of the sections 1 2 is correspondingly numbered. The former is numbered upon its outer face, as at 4, and the latter numbered transversely of its inner face, as at 5, and upon its outer face, as at 6. The number used, for example, is "10,517." Each of the sections is further provided with corresponding rows of figures and a corresponding group of figures at one end of the rows of figures. When the figures are punched in a manner hereinafter described, it will indicate the weight of the material within the bale, sack, or receptacle.

The reference-numeral 7 denotes one of the rows of figures upon the outer face of section 1 and the inner face of section 2 for indicating the units. This row of figures is as follows: "0, 1, 2, 3, 4, 5, 6, 7, 8, 9."

The reference-numeral 8 denotes the other of the rows of figures upon the outer face of the section 1 and the inner face of the section 2 for indicating the tenths. This row of figures is as follows: "1, 2, 3, 4, 5, 6, 7, 8, 9, 0."

The rows of figures 7 and 8 preferably extend longitudinally of the outer face of the section 1 and the inner face of the section 2 and are arranged parallel with each other, although the rows may be arranged in any suitable manner than that shown and more than two rows of figures employed. If so, the additional rows will indicate the hundredths and thousandths, &c. The additional rows are not shown. The preferred form of construction is as shown—that is, the arrangement of two rows of figures extending parallel to one another upon the outer face of the section 1 and the inner face of the section 2.

The reference-numeral 9 denotes a group of figures arranged at one end of the rows of figures 7 8, and this group of figures is adapted to indicate the hundreds. The group comprises the figures "3," "4," "5," "6," and "7," although the number of the figures can be increased or decreased, if desired. The numbers shown are those preferably used to indicate the hundreds in connection with the weighing of bales of cotton, which the tag is particularly adapted for. The rows and groups of figures are arranged upon the outer face of the section 1 and inner face of the section 2 in such a manner that when the figures upon the attachable section 1 are punched the corresponding figures are simultaneously punched upon the removable section 2.

The tag is used as follows: Assuming that it is constructed in duplicate, as shown, the bale, sack, or receptacle is weighed and, for example, it will be said that the weight is four hundred and fourteen, the figure "4" from each group 9 is first punched, the figure "1" from each row of figures 7 is then punched, and the figure "4" from each row of figures 8 is then punched, thus indicating that the bale, sack, or receptacle weighs four hundred and fourteen pounds. The section 1 is then attached to the bale, sack, or receptacle in any suitable manner and the section 2 detached therefrom, the latter being kept as a certificate, reference, record, or authentication. It will be obvious that by a comparison of the certificate-section 2 with the attached section 1 if they both correspond the weight of the bale, sack, or receptacle as indicated upon the attached section 1 is correct. If the sections do not correspond, then it will be obvious that either of the sections has been tampered with. As before stated, the sections are correspondingly numbered, whether they be in duplicate, triplicate, or quadruplicate.

It will be evident that by constructing a tag in the manner as hereinbefore set forth buyers and sellers of articles to be weighed and measured will be protected, as the weights or quantities originally indicated cannot be raised, altered, or obliterated, thus affording great protection, which is much needed where certificates of weights, measures, or quantities are required and used, and it is thought the many advantages of the tag can be readily understood by the foregoing description taken in connection with the accompanying drawings, and it will also be evident that I have devised a simple and novel and inexpensive tag for the purpose set forth, and while the structural embodiment of the invention as herein disclosed is what I at the present time consider the preferable one it will be evident that changes, variations, and modifications as to the arrangement of the rows and groups of figures may be resorted to without departing from the spirit of the invention or sacrificing any of its advantages, and I therefore reserve the right to make such changes, variations, and modifications which come properly within the scope of the protection prayed.

Having thus fully described my invention, what I claim as new, and desire to secure by Letters Patent, is—

A tag for cotton-bales, consisting of a foldable strip of suitable material formed into a plurality of separable sections having a corresponding designatory number on their outer faces, one of said sections having its inner face provided with a designatory number corresponding with the number on its outer face and the other of said sections provided at its free end with means to permit of attaching the said section to a bale, and the said sections further provided on one face with weight-indicating figures, the weight-indicating figures on each of the sections comprising two parallel rows of corresponding figures to indicate units and a group of figures at one end of each pair of rows of figures to indicate hundreds, said rows and groups of figures arranged upon a corresponding portion of each of the sections, so that when the outer or inner face of one section is folded against the inner or outer face of the other section and a figure of one row or group of one section is punched, the figure of the corresponding row or group of the other section will be simultaneously punched, substantially as herein shown and described.

In testimony whereof I have hereunto set my hand in presence of two subscribing witnesses.

ROBERT G. CROSBY.

Witnesses:
W. W. POLK,
R. J. DANIEL.